W. Seaton,
Slotting Tool Holder.
№ 99,113.      Patented Jan. 25, 1870.
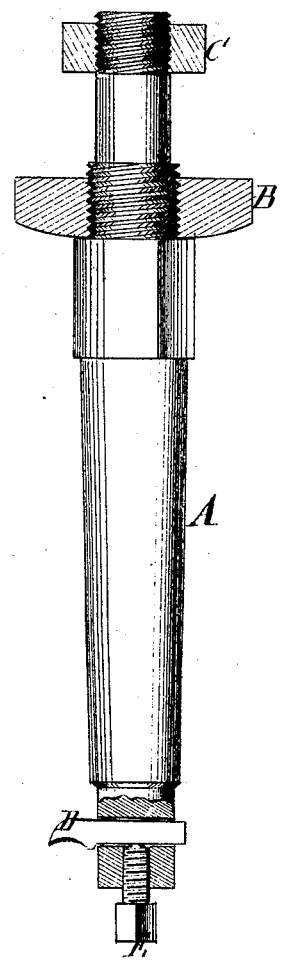
Witnesses
Inventor
Wm Seaton
per Munn & Co
Attorneys

United States Patent Office.

WILLIAM SEATON, OF PUTNAM, CONNECTICUT.

Letters Patent No. 99,113, dated January 25, 1870.

IMPROVED SLOTTING-TOOL HOLDER.

The Schedule referred to in these Letters Patent and making part of the same.

*To all whom it may concern:*

Be it known that I, WILLIAM SEATON, of Putnam, in the county of Windham, and State of Connecticut, have invented a new and improved Slotting-Tool; and I do hereby declare that the following is a full, clear, and exact description thereof, which will enable others skilled in the art to make and use the same, reference being had to the accompanying drawings, forming part of this specification.

The object of this invention is to provide a more useful and convenient tool-holder, for attachment to planers for inside slotting or grooving, such as cutting key-seats in wheels.

The invention consists in an improved slotting-tool holder, for attachment to an ordinary tool-carrying device of a planer, to project therefrom parallel with the planer-bed, so as to work through the eye of a wheel, standing on its face on the planer-bed, and carrying a tool at the projecting end, transversely thereto, and so attached to the planer as to be readily adjusted around its axis, for cutting at any part of the eye of the wheel, as hereinafter more fully specified.

The drawing represents a view of my improved tool-holder, partly sectioned.

The shank A consists of a round or other suitably-formed shaft, fitted at the rear end to engage with the hinged tool-holder of a planer, by passing through a round hole therein, so as to project horizontally therefrom. It is secured by two nuts, B C, screwing on the said end, one in front of the said tool-holder of the planer, and the other behind, by which it is firmly clamped to its seat.

The front end is provided with a cutter, D, seated in a transverse mortise, and held by a set-screw, E, screwing in the end, at the centre, against the said cutter.

This simple tool-holder may be readily applied at any time, and by loosening the nut B, may be adjusted for cutting either at the bottom of the hole, as the wheel stands on the planer-bed, or the top, or any other part.

Having thus described my invention,

I claim as new, and desire to secure by Letters Patent—

The improved tool-holder, consisting of stock A, constructed as shown, nuts B C, and fastening-screw E, each of said parts being arranged, and the whole operating on a planer, in the manner specified.

WILLIAM SEATON.

Witnesses:
 H. JOHNSON,
 BENJAMIN SEATON.